United States Patent
Wang et al.

(10) Patent No.: US 9,613,450 B2
(45) Date of Patent: *Apr. 4, 2017

(54) PHOTO-REALISTIC SYNTHESIS OF THREE DIMENSIONAL ANIMATION WITH FACIAL FEATURES SYNCHRONIZED WITH SPEECH

(75) Inventors: Lijuan Wang, Beijing (CN); Frank Soong, Beijing (CN); Qiang Huo, Beijing (CN); Zhengyou Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1125 days.

This patent is subject to a terminal disclaimer.

(21) Appl. No.: 13/099,387

(22) Filed: May 3, 2011

(65) Prior Publication Data

US 2012/0280974 A1 Nov. 8, 2012

(51) Int. Cl.
*G06T 13/40* (2011.01)
*G10L 21/10* (2013.01)

(52) U.S. Cl.
CPC .............. *G06T 13/40* (2013.01); *G10L 21/10* (2013.01); *G10L 2021/105* (2013.01)

(58) Field of Classification Search
CPC ... G06T 13/40; G06T 13/205; G06T 2200/24; G10L 2021/105; G06K 9/00335; G06K 9/00268
USPC .......... 704/235, 270; 382/118, 203; 345/473
See application file for complete search history.

(56) References Cited

U.S. PATENT DOCUMENTS

| | | | |
|---|---|---|---|
| 6,028,960 A * | 2/2000 | Graf et al. ................... 382/203 |
| 6,449,595 B1 * | 9/2002 | Arslan et al. ................. 704/235 |
| 6,504,546 B1 * | 1/2003 | Cosatto ................... G06T 13/40 |
| | | | 345/473 |
| 6,661,418 B1 | 12/2003 | McMillan et al. |
| 6,735,566 B1 | 5/2004 | Brand et al. |
| 6,919,892 B1 | 7/2005 | Cheiky et al. |

(Continued)

OTHER PUBLICATIONS

Cosatto, Eric, and Hans Peter Graf. "Sample-based synthesis of photo-realistic talking heads." Computer Animation 98. Proceedings. IEEE, 1998.*

(Continued)

*Primary Examiner* — Douglas Godbold
*Assistant Examiner* — Mark Villena

(57) ABSTRACT

Dynamic texture mapping is used to create a photorealistic three dimensional animation of an individual with facial features synchronized with desired speech. Audiovisual data of an individual reading a known script is obtained and stored in an audio library and an image library. The audio-visual data is processed to extract feature vectors used to train a statistical model. An input audio feature vector corresponding to desired speech with which the animation will be synchronized is provided. The statistical model is used to generate a trajectory of visual feature vectors that corresponds to the input audio feature vector. These visual feature vectors are used to identify a matching image sequence from the image library. The resulting sequence of images, concatenated from the image library, provides a photorealistic image sequence with facial features, such as lip movements, synchronized with the desired speech. This image sequence is applied to the three-dimensional model.

20 Claims, 5 Drawing Sheets

(56) References Cited

U.S. PATENT DOCUMENTS

| | | | |
|---|---|---|---|
| 7,168,953 | B1 | 1/2007 | Poggio et al. |
| 7,689,421 | B2 | 3/2010 | Li et al. |
| 7,990,384 | B2 | 8/2011 | Cosatto et al. |
| 2003/0163315 | A1* | 8/2003 | Challapali ............... G06T 13/40 704/260 |
| 2004/0064321 | A1* | 4/2004 | Cosatto et al. ............... 704/276 |
| 2004/0120554 | A1* | 6/2004 | Lin et al. ...................... 382/118 |
| 2005/0057570 | A1* | 3/2005 | Cosatto .................. G06T 13/40 345/473 |
| 2005/0117802 | A1* | 6/2005 | Yonaha .............. G06K 9/00597 382/173 |
| 2006/0012601 | A1* | 1/2006 | Francini et al. .............. 345/473 |
| 2006/0204060 | A1* | 9/2006 | Huang et al. ................. 382/118 |
| 2007/0091085 | A1 | 4/2007 | Wang et al. |
| 2008/0221904 | A1* | 9/2008 | Cosatto et al. .............. 704/276 |
| 2008/0235024 | A1 | 9/2008 | Goldberg et al. |
| 2010/0007665 | A1* | 1/2010 | Smith ..................... G06T 13/40 345/473 |
| 2010/0085363 | A1 | 4/2010 | Smith et al. |

OTHER PUBLICATIONS

"Non Final Office Action" U.S. Appl. No. 13/098,488 dated May 2, 2011, pp. 13.

Lei Xie et al., "A coupled HMM approach to video-realistic speech animation", Pattern Recognition Society, 2006, pp. 16.

Kang Liu et al., "Optimization of an Image-based Talking Head System", Jul. 3, 2009, pp. 1-13.

Graf, et al., "Face Analysis for the Synthesis of Photo-Realistic Talking Heads", Retrieved at << http://ieeexplore.ieee.org/stamp/stamp.jsp?tp=&arnumber=840633 >>, Proceedings. Fourth IEEE International Conference on Automatic Face and Gesture Recognition, 2000, pp. 6.

Theobald, et al., "2.5D Visual Speech Synthesis Using Appearance Models", Retrieved at << http://citeseerx.ist.psu.edu/viewdoc/download?doi=10.1.1.101.5421&rep=rep1&type=pdf >>, In Proceedings of the British Machine Vision Conference (BMVC), 2003, pp. 10.

Tao, et al., "Speech Driven Face Animation Based on Dynamic Concatenation Model", Retrieved at << http://affectivecomputing.org/paper/2007/SpeechDrivenFaceAnimation_JICS07.pdf >>, Journal of Information & Computational Science, 2006, pp. 1-10.

Sheng, et al., "Automatic 3D face synthesis using single 2D video frame", Retrieved at << http://dspace.brunel.ac.uk/bitstream/2438/1172/1/4.pdf >>, Electronics Letters, vol. 40, No. 19, Sep. 16, 2004, pp. 2.

"Agenda with Abstracts", Retrieved on: Feb. 22, 2011, Available at: http://research.microsoft.com/en-us/events/asiafacsum2010/agenda_expanded.aspx.

Bregler, et al., "Video Rewrite: Driving Visual Speech with Audio", In Proceedings of the 24th International Conference on Computer Graphics and Interactive Techniques, Aug. 3, 1997, 8 Pages.

Chen, Tsuhan, "Audiovisual Speech Processing", In IEEE Signal Processing Magazine, vol. 8, Issue 1, Jan. 2001, pp. 9-21.

Donovan, et al., "The IBM Trainable Speech Synthesis System", In Proceedings of the 5th International Conference of Spoken Language Processing, 1998, 4 Pages.

Ezzat, et al., "Miketalk: A Talking Facial Display based on Morphing Visemes", In Proceedings of the Computer Animation Conference, Jun. 1998, 7 Pages.

Ezzat, et al., "Trainable VideoRealistic Speech Animation", In Proceedings of the 29th International Conference on Computer Graphics and Interactive Techniques, Jul. 21, 2002, 11 Pages.

Huang, et al., "Recent Improvements on Microsoft's Trainable Text-to-speech System-Whistler", In Proceedings of the International Conference on Acoustics, Speech, and Signal Processing, Apr. 1997, 4 Pages.

Huang, et al., "Triphone Based Unit Selection for Concatenative Visual Speech Synthesis", In IEEE International Conference on Acoustics, Speech, and Signal Processing, Apr. 27, 1993, pp. II-2037-II-2040.

Hunt, et al., "Unit Selection in a Concatenative Speech Synthesis System using a Large Speech Database", In IEEE International Conference on Acoustics, Speech, and Signal Processing, May 7, 1996, pp. 373-376.

King, et al., "Creating Speech-Synchronized Animation", In IEEE Transactions on Visualization and Computer Graphics, vol. 11, Issue 3, Jun. 2005, pp. 341-352.

Lewis, JP., "Fast Normalized Cross-correlation", In Vision interface, vol. 10, Issue 1, 1995, 7 Pages.

Liu, et al., "Parameterization of Mouth Images by LLE and PCA for Image-based Facial Animation", In IEEE International Conference on Acoustics, Speech and Signal Processing, vol. 5, May 2006, pp. V-461-V-464.

Liu, et al., "Realistic Facial Animation System for Interactive Services", In Proceedings of the 9th Annual Conference of the International Speech Communication Association, Sep. 22, 2008, pp. 2330-2333.

Lucey, et al., "Integration Strategies for Audio-Visual Speech Processing: Applied to Text-Dependent Speaker Recognition", In IEEE Transactions on Multimedia, vol. 7, Issue 3, Jun. 2005, pp. 495-506.

Masuko, et al., "Speech Synthesis using HMMs with Dynamic Features", In IEEE International Conference on Acoustics, Speech and Signal Processing, May 7, 1996, pp. 389-392.

Matiheyses, et al., "Multimodal Unit Selection for 2D Audiovisual Text-to-Speech Synthesis", In Book: Machine Learning for Multimodal interaction, Sep. 8, 2008, 12 Pages.

Nakamura, et al., "Statistical Multimodal Integration for Audio-Visual Speech Processing", In IEEE Transactions on Neural Networks, vol. 7, Issue 3, Jun. 2005, pp. 854-866.

Perez, et al., "Poisson Image Editing", In Special Interest Group on Computer Graphics and Interactive Techniques, Jul. 27, 2003, pp. 313-318.

Potamianos, et al., "An Image Transform Approach for HMM Based Automatic Lipreading", In Proceedings of the International Conference on Image Processing, Oct. 1998, pp. 173-177.

Takuda, et al., "Hidden Markov Models based on Multi-Space Probability Distribution for Pitch Pattern Modeling", In IEEE International Conference on Acoustics, Speech, and Signal Processing, Mar. 15, 1999, 4 Pages.

Theobald, et al., "LIPS2008: Visual Speech Synthesis Challenge", In Interspeech, 2008, 4 Pages.

Toda, et al., "Spectral Conversion based on Maximum Likelihood Estimation Considering Global Variance of Converted Parameter", In IEEE International Conference on Acoustics, Speech, and Signal Processing, vol. 1, Mar. 2005, pp. 9-12.

Wang, et al., "Real-Time Bayesian 3-D Pose Tracking", In IEEE Transactions on Circuits and Systems for Video Technology, vol. 16, Issue 12, Dec. 2006, pp. 1533-1541.

Xie, et al., "Speech Animation Using Coupled Hidden Markov Models", In Proceedings of the 18th International Conference on Pattern Recognition, Aug. 20, 2006, 4 Pages.

Yan, et al., "Rich-Context Unit Selection (RUS) Approach to High Quality TTS", In IEEE International Conference on Acoustics, Speech and Signal Processing, Mar. 14, 2010, pp. 4798-4801.

Zen, et al., "The HMM-Based Speech Synthesis System (HTS) Version 2.0", In Proceedings of the ISCA Workshop on Speech Synthesis, Aug. 22, 2007, pp. 294-299.

Zhuang, et al., "A Minimum Converted Trajectory Error (MCTE) Approach to High Quality Speech-to-Lips Conversion", In Proceedings of the 11th Annual Conference of the International Speech Communication Association, Sep. 26, 2010, 4 Pages.

"Final Office Action Issued in U.S. Appl. No. 13/098,488", Mailed Date: Nov. 13, 2013, 15 Pages.

"Non-Final Office Action Issued in U.S. Appl. No. 13/098,488", Mailed Date: Jun. 8, 2015, 16 Pages.

"Final Office Action Issued in U.S. Appl. No. 13/098,488", Mailed Date: Mar. 18, 2016, 15 Pages.

* cited by examiner

PHOTO-REALISTIC SYNTHESIS OF THREE DIMENSIONAL ANIMATION WITH FACIAL FEATURES SYNCHRONIZED WITH SPEECH

BACKGROUND

Three-dimensional animation and two-dimensional image sequences with lip movements synchronized with speech are commonly called "talking heads." Talking heads are useful in applications of human-machine interaction, e.g. reading emails, news or eBooks, acting as an intelligent voice agent or a computer assisted language teacher, etc. A lively talking head can attract the attention of a user, make the human/machine interface more engaging or add entertainment to an application.

Generating talking heads that look like real people is challenging. A talking head needs to be not just photo-realistic in a static appearance, but exhibit convincing plastic deformations of the lips synchronized with the corresponding speech, because the most eye-catching region of a talking face involves the "articulators" (around the mouth including lips, teeth, and tongue).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Audiovisual data of an individual reading a known script is obtained and stored in an audio library and an image library. The audiovisual data is processed to extract feature vectors used to train a statistical model, such as a context dependent hidden Markov model, in which a single Gaussian mixture model (GMM) is used to characterize state outputs. An input audio feature vector corresponding to desired speech with which animation will be synchronized is provided. This input audio feature vector may be derived from text or from a speech signal.

The audiovisual data also may be used to generate a three-dimensional model of the individual's head. Other data also may be used to generate such a three-dimensional model.

The statistical model is used to generate a trajectory of visual feature vectors that corresponds to the input audio feature vector. These visual feature vectors are used to identify a matching image sequence from the image library. The matching process takes into account both a target cost and a concatenation cost. The target cost represents a measure of the difference (or similarity), between feature vectors of images in the image library and the feature vectors in the trajectory. For example, the target cost may be a Euclidean distance between pairs of feature vectors. The concatenation cost represents a measure of the difference (or similarity) between adjacent images in the output image sequence. For example, the concatenation cost may be a correlation between adjacent images in the output image sequence. The resulting sequence of images, concatenated from the image library, provides a photorealistic image sequence with facial features, such as lip movements, synchronized with the desired speech.

This photorealistic image sequence can be applied to the three-dimensional model to provide a photorealistic three-dimensional animation of the individual's head with facial features, such as lip movements, synchronized with the desired speech. Images of other parts of the individual's face that correspond with the selected images of the lips also can be used and applied to the three-dimensional model to capture other aspects of the individual's expression during speech. In addition, animation can be applied to the talking head.

In the following description, reference is made to the accompanying drawings which form a part hereof, and in which are shown, by way of illustration, specific example implementations of this technique. It is understood that other embodiments may be utilized and structural changes may be made without departing from the scope of the claimed subject matter.

DETAILED DESCRIPTION

The following section provides an example system environment in which generation of photorealistic three-dimensional animation can be used.

Figure 1:
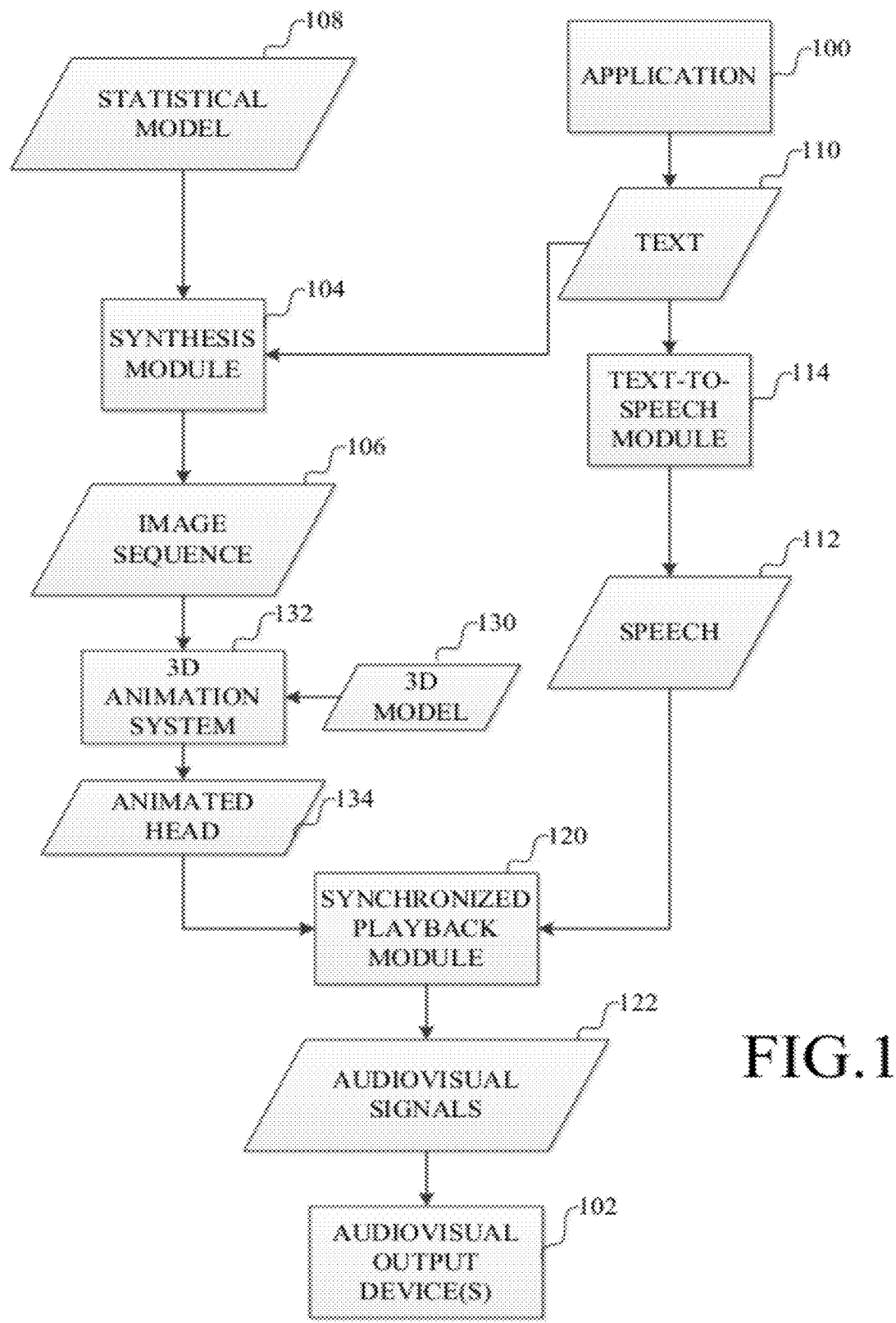
FIG. 1 is a block diagram of an example system using generation of photorealistic three dimensional animation.

Referring now to FIG. 1, a computer application 100 includes a talking head as part of its human/machine interface which includes an audiovisual output device 102. The audiovisual output device 102 includes one or more devices which display images, such as a computer monitor, computer display or television screen, and one or more devices that reproduce sound, such as speakers and the like. The device 102 typically is proximate the end user to permit the end user to see and hear the three dimensional animation with lip movements synchronized with speech. However, the application 100 may be located on a remote computer.

The application 100 can use a talking head for a variety of purposes. For example, the application 100 can be a computer assisted language learning applications, a language dictionary (e.g., to demonstrate pronunciation), an email reader, a news reader, a book reader, a text-to-speech system, an intelligent voice agent, an avatar of an individual for a virtual meeting room, a virtual agent in dialogue system, video conferencing, online chatting, gaming, movie animation, or other application that provides visual and speech-based interaction with an individual.

In general, such an application 100 provides an input, such as text 110, or optionally speech 112, to a synthesis module 104, which in turn generates an image sequence 106 with lip movements synchronized with speech that matches the text or the input speech. The synthesis module 104 relies on a model 108, described in more detail below. The operation of the synthesis module also is described in more detail below. The image sequence is applied to a three dimensional model 130 of the individual's head by a 3d animation system 132 to provide 3d animation 134

When text is provided by the application 100, the text 110 is input to a text-to-speech conversion module 114 to generate speech 112. The application 100 also might provide a speech signal 112, in which case the text-to-speech conversion is not used and the synthesis module generates an image sequence 106 using the speech signal 112.

The speech signal 112 and the three dimensional animation 134 are played back using a synchronized playback module 120, which generates audiovisual signals 122 that output to the end user through an audiovisual output device 102. The synchronized playback module may reside in a computing device at the end user's location, such as a general purpose computer or game console, such as the XBOX or KINECT consoles from Microsoft Corporation, or may be in a remote computer.

Having now described the application environment in which the synthesis of image sequences may be used and applied to a three dimensional model of a head, how such three dimensional animations are generated will now be described.

Figure 2:
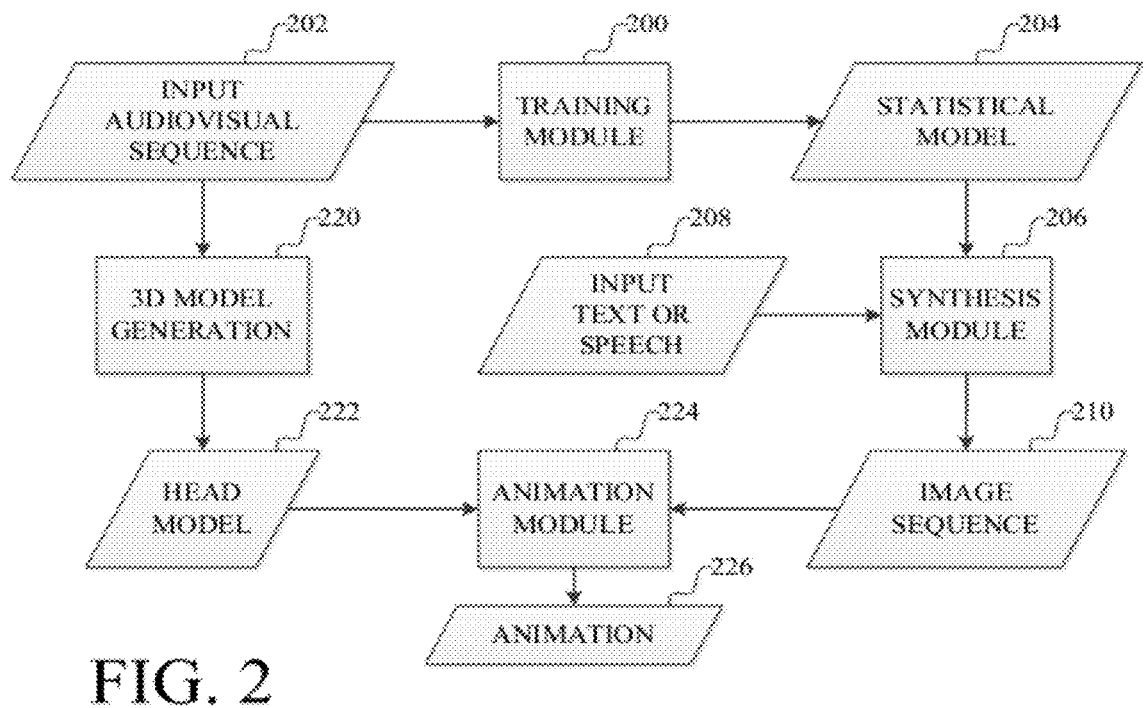
FIG. 2 is a data flow diagram of a system for generating photorealistic three dimensional animation.

Referring now to FIG. 2, there are two parts to generating an image sequence: generating or training a model using samples of audiovisual data with known lip movements and known speech, and synthesis of an image sequence using the model and a target speech with which the image sequence is to be synchronized. These systems are combined with a three-dimensional model of the individual's head to provide three dimensional animation.

FIG. 2 shows a training module 200 that receives as its input an audiovisual sequence 202 that includes actual audio data and video data of an individual speaking a known script or text. The output of the training module 200 is a model 204. The model is a statistical model of the audiovisual data over time, based on acoustic feature vectors from the audio data and visual feature vectors from the video data of an individual's articulators during speech.

The model 204 is used by a synthesis module 206 to generate a visual feature vector sequence corresponding to an input set of feature vectors for speech with which the facial animation is to be synchronized. The input set of feature vectors for speech is derived from input 208, which may be text or speech. The visual feature vector sequence is used to select an image sample sequence from an image library (part of the model 204). This image sample sequence is processed to provide the photo-realistic image sequence 210 to be synchronized with speech signals corresponding to the input 208 of the synthesis module.

The training module, in general, would be used once for each individual for whom a model is created for generating photorealistic image sequences. The synthesis module is used each time a new text or speech sequence is provide for which a new image sequence is to be synthesized from the model. It is possible to create, store and re-use image sequences from the synthesis module instead of recomputing them each time.

Also shown in FIG. 2 is a three-dimensional model generation module 220. This module can take as an input the audiovisual sequence 202 and convert the video data into a three-dimensional model 222 of the head.

For example where the input is a video sequence containing a face rotating from frontal view to profile view before a fixed camera, the techniques described in Le Xin, Qiang Wang, Jianhua Tao, Xiaoou Tang, Tieniu Tan, and Harry Shum, "Automatic 3D Face Modeling from Video," in *Proc. ICCV'05*, may be used. This technique involves performing automatic initialization in the first frame with approximately frontal face. Then, to handle the case of low quality image captured by low cost camera, the 2D feature matching, head poses and underlying 3D face shape are estimated and refined iteratively in an efficient way based on image sequence segmentation. Finally, to take advantage of the sparse structure of the proposed algorithm, sparse bundle adjustment technique is further employed to speed up the computation.

In some cases, the three dimensional model of the head can be generated from a single frontal image of the individual, as described in Yuxiao Hu, Dalong Jiang, Shuicheng Yan, Lei Zhang, Hongjiang Zhang, "Automatic 3D Reconstruction for Face Recognition," in Proc. of the Sixth IEEE international Conference on Automatic Face and Gesture Recognition (FGR'04). In particular, a frontal face image of a subject with normal illumination and neutral expression is input. A semi-supervised ranking prior likelihood models for accurate local search and a robust parameter estimation approach is used for face alignment. Based on this 2D alignment algorithm, 83 key feature points are automatically located. The feature points are accurate enough for face reconstruction in most cases. A general 3D face model is applied for personalized 3D face reconstruction. The 3D shapes have been compressed by the Principal Component Analysis (PCA). After the 2D face alignment, the key feature points are used to compute the 3D shape coefficients of the eigenvectors. Then, the coefficients are used to reconstruct the 3D face shape. Finally, the face texture is extracted from the input image. By mapping the texture onto the 3D face geometry, the 3D face model for the input 2D face image is reconstructed.

Alternatively, the three-dimensional model can be created through other techniques, such as sampling or motion capture or other common modeling techniques. The output image sequence 210 from the synthesis module is applied to the three-dimensional model 222 of the head in an animation module 224 to provide animation 226.

Training of the statistical model will be described first in connection with FIGS. 3-4.

Figure 3:
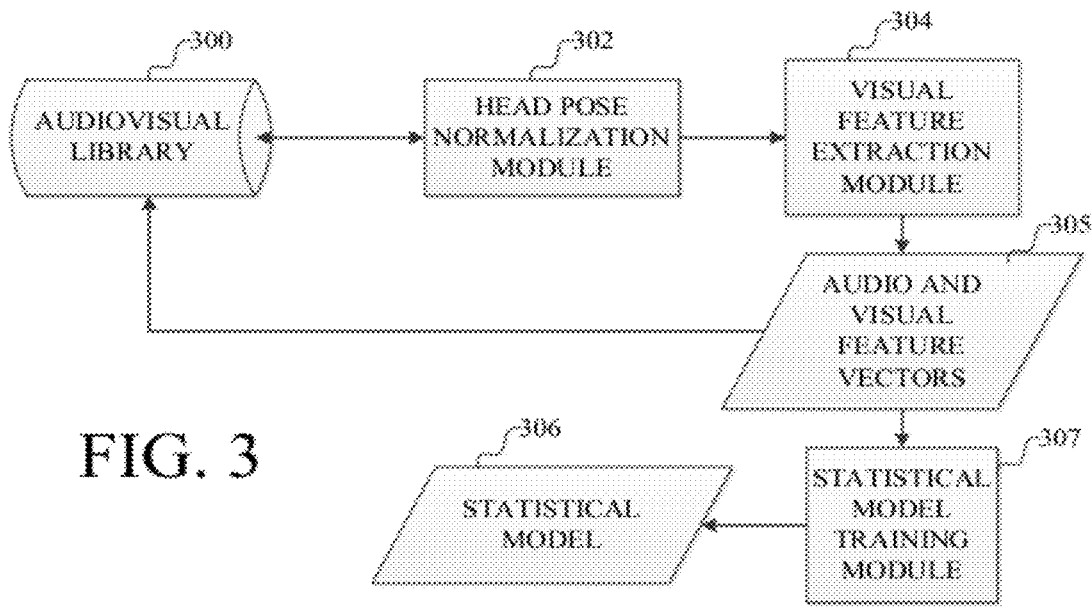
FIG. 3 is a data flow diagram of a training module in the system of FIG. 2.

In FIG. 3, an example training system includes an audiovisual database 300 in which audiovisual content is captured and stored. For each individual for which an image sequence can be synthesized, some audiovisual content of that individual speaking, e.g., reading from a known script or reading known text, is captured. In general, about twenty minutes of audiovisual content is suitable for training. An ideal set of utterances to be recorded is phonetically balanced in the language spoken by the individual, and the recording is done in a studio setting. The Arctic database constructed by Carnegie-Mellon University is one example of a database of suitable recordings.

Because a reader typically moves his or her head naturally during recording, the images can be normalized for head position by a head pose normalization module 302. For example, the poses of each frame of the recorded audio visual content are normalized and aligned to a full-frontal view. An example implementation of head pose normalization is to use the techniques found in Q. Wang, W. Zhang, X. Tang, H. Y. Shum, "Real-time Bayesian 3-d pose tracking," IEEE Transactions on Circuits and Systems for Video Technology 16(12) (2006), pp. 1533-1541. Next, the images of just the articulators (i.e., the mouth, lips, teeth, tongue, etc.) are cropped out with a fixed rectangle window and a library of lips sample images is made. These images also may be stored in the audiovisual database 300 and/or passed on to a visual feature extraction module 304.

Using the library of lips sample images, visual feature extraction module 304 generates visual feature vectors for each image. In one implementation, eigenvectors of each lips image are obtained by applying principal component analysis (PCA) to each image. From experiments, the top twenty eigenvectors contained about 90% of the accumulated variance. Therefore, twenty eigenvectors are used for each lips image. Thus the visual feature vector for each lips image $S^T$ is described by its PCA vector, $$V^T = S^T W \qquad (1)$$

where W is the projection matrix made by the top 20 eigenvectors of the lips images.

Acoustic feature vectors for the audio data related to each of the lips sample images also are created, using conventional techniques such as by computing the Mel-frequency cepstral coefficients (MFCCs).

Next, the audio and video feature vectors 305 (which also may be stored in the audiovisual library) are used by a statistical model training module 307 to generate a statistical model 306. In one implementation, acoustic vectors $A_t = [\alpha_t^T, \Delta\alpha_t^T, \Delta\Delta\alpha_t^T]^T$ and visual vectors $V_t = [v_t^T, \Delta v_t^T, \Delta\Delta v_t^T]^T$ are used, which are formed by augmenting the static features and their dynamic counterparts to represent the audio and video data. Audio-visual hidden Markov models (HMMs), $\lambda$, are trained by maximizing the joint probability $p(A, V/\lambda)$ over the acoustic and visual training vectors. In order to capture the contextual effects, context dependent HMMs are trained and tree-based clustering is applied to acoustic and visual feature streams separately to improve the corresponding model robustness. For each audiovisual HMM state, a single Gaussian mixture model (GMM) is used to characterize the state output. The state q has a mean vectors $\mu_q^{(A)}$ and $\mu_q^{(V)}$. In one implementation, the diagonal covariance matrices for $\Sigma_q^{(AA)}$ and $\Sigma_q^{(VV)}$, null covariance matrices for $\Sigma_q^{(AV)}$ and $\Sigma_q^{(VA)}$, are used by assuming the independence between audio and visual streams and between different components. Training of an HMM is described, for example, in *Fundamentals of Speech Recognition* by Lawrence Rabiner and Biing-Hwang Juang, Prentice-Hall, 1993.

Figure 4:
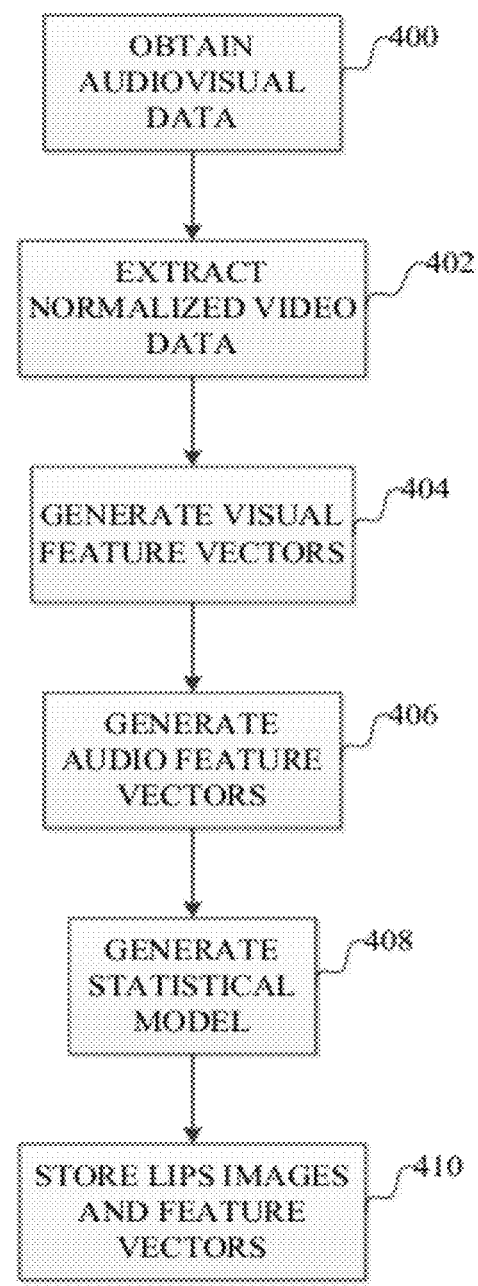
FIG. 4 is a flow chart describing training of a statistical model.

Referring now to FIG. 4, a flowchart describing the training process will now be described in more detail. First, as shown at 400, audiovisual data of an individual is obtained. Normalized visual data of the articulators of the individual are extracted 402 from the audiovisual data, herein called lips images. The lips images are processed 404 to generate visual feature vectors; the audio data is process 406 to generate audio feature vectors. The sequences of audio and visual feature vectors over time are used to generate 408 a statistical model, such as context dependent hidden Markov model that uses a single Gaussian mixture model to characterize state output. The lips images and corresponding audio and visual feature vectors can be stored 410 in a manner such that they are associated with the original audiovisual data from which they were derived.

Having now described how a statistical model is trained using audiovisual data, the process of synthesizing an image sequence using this model will now be described in more detail.

Figure 5:
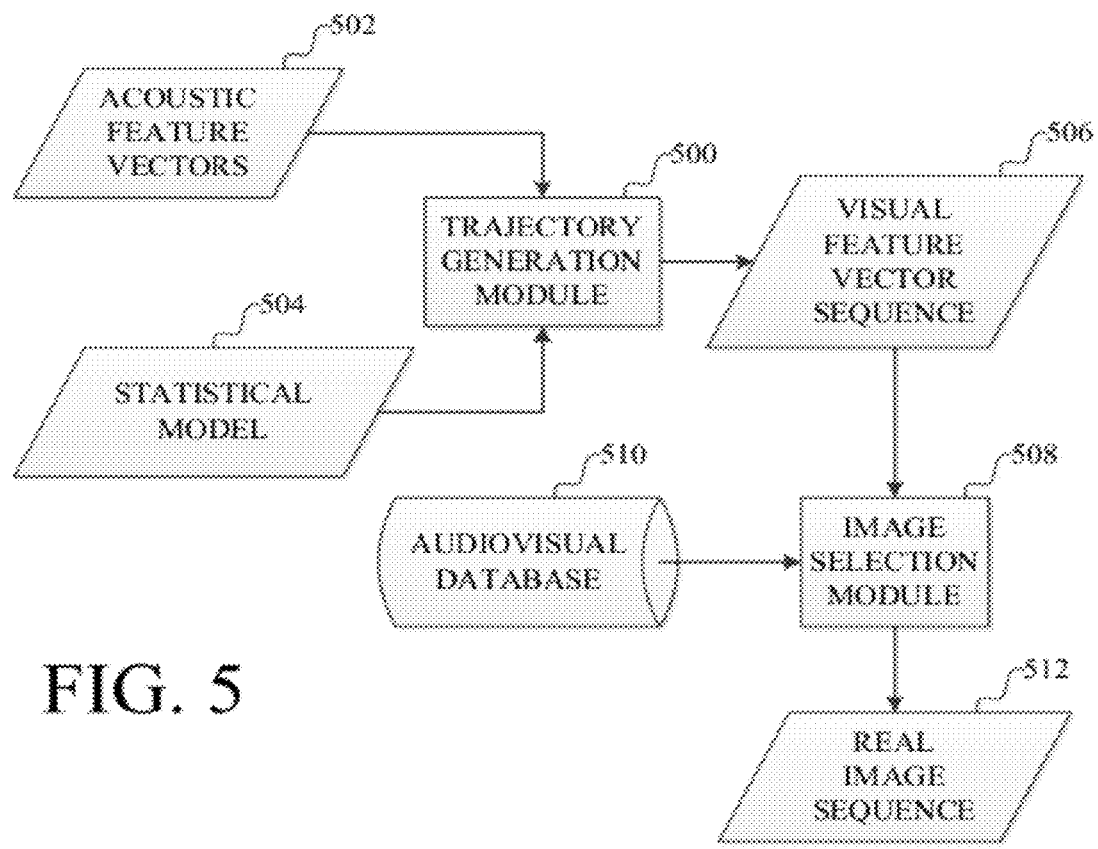
FIG. 5 is a data flow diagram of a synthesis module in the system of FIG. 2.

Referring now to FIG. 5, a system for such synthesis includes a trajectory generation module 500 that receives, as inputs, acoustic feature vectors 502 and a model 504, and outputs a corresponding visual feature vector sequence 506. This sequence 506 corresponds directly to a sequence of lips images used to train the model 504.

An implementation of module 500 is as follows. Given a continuous audiovisual HMM $\lambda$, and acoustic feature vectors $A = [A_1^T, A_2^T, \ldots, A_T^T]^T$, the module identifies a visual feature vector sequence $V = [V_1^T, V_2^T, \ldots, V_T^T]^T$ such that the following likelihood function is maximized:

$$p(V|A,\lambda) = \Sigma_{all\ Q} p(Q|A,\lambda) \cdot p(V|A,Q,\lambda), \qquad (2)$$

Equation (2) is maximized with respect to V, where Q is the state sequence. In particular, at frame t, $p(V_t|A_t, q_t, \lambda)$ are given by:

$$p(V_t|A_t,q_t,\lambda) = N(V_t; \hat{\mu}_{q_t}^{(V)}, \hat{\Sigma}_{q_t}^{(VV)}), \qquad (3), \text{where}$$

$$\hat{\mu}_{q_t}^{(V)} = \mu_{q_t}^{(V)} + \Sigma_{q_t}^{(VA)} \Sigma_{q_t}^{(AA)^{-1}}(A_t - \mu_{q_t}^{(A)}) \qquad (4), \text{and}$$

$$\hat{\Sigma}_{q_t}^{(VV)} = \Sigma_{q_t}^{(VV)} - \Sigma_{q_t}^{(VA)} \Sigma_{q_t}^{(AA)^{-1}} \Sigma_{q_t}^{(AV)}. \qquad (5)$$

We consider the optimal state sequence Q by maximizing the likelihood function $p(Q|A, \lambda)$ with respect to the given acoustic feature vectors A and model $\lambda$. Then, the logarithm of the likelihood function is written as $$\log p(V|A,Q,\lambda) = \log p(V|\hat{\mu}^{(V)}, \hat{U}^{(VV)}) = -\tfrac{1}{2} V^T \hat{U}^{(VV)^{-1}} V + V^T \hat{U}^{(VV)^{-1}} \hat{\mu}^{(V)} + K, \qquad (6)$$

where $$\hat{\mu}^{(V)} = [\hat{\mu}_{q_1}^{(V)}, \hat{\mu}_{q_2}^{(V)}, \ldots, \hat{\mu}_{q_T}^{(V)}]^T, \qquad (7)$$

$$\hat{U}^{(VV)^{-1}} = \text{diag}[\hat{\Sigma}_{q_1}^{(VV)^{-1}}, \hat{\Sigma}_{q_2}^{(VV)^{-1}}, \ldots, \hat{\Sigma}_{q_T}^{(VV)^{-1}}]^T. \qquad (8)$$

The constant K is independent of V. The relationship between a sequence of the static feature vectors $C = [v_1^T, v_2^T, \ldots, v_T^T]^T$ and a sequence of the static and dynamic feature vectors V can be represented as a linear conversion, $$V = W_c C, \qquad (9)$$

where $W_c$ is a transformation matrix, such as described in K. Tokuda, H. Zen, etc., "The HMM-based speech synthesis system (HTS)". By setting $$\frac{\partial}{\partial C} \log p(V|A, Q, \lambda) = 0,$$

$\hat{V}_{opt}$ that maximizes the logarithmic likelihood function is given by $$\hat{V}_{opt} = W_c \hat{C}_{opt} = W_c (W_c^T \hat{U}^{(VV)^{-1}} W_c)^{-1} W_c^T \hat{U}^{(VV)^{-1}} \hat{\mu}^{(V)}. \qquad (10)$$

The visual feature vector sequence 506 is a compact description of articulator movements in the lower rank eigenvector space of the lips images. However, the lips image sequence to which it corresponds, if used as an output image sequence, would be blurred due to: (1) dimensionality reduction in PCA; (2) maximum likelihood (ML)-based model parameter estimation and trajectory generation. Therefore, this trajectory is used to guide selection of the real sample images, which in turn are concatenated to construct the output image sequence. In particular, an image selection module 508 receives the visual feature vector sequence 506 and searches the audiovisual database 510 for a real image sample sequence 512 in the library which is closest to the predicted trajectory as the optimal solution. Thus, the articulator movement in the visual trajectory is reproduced and photo-realistic rendering is provided by using real image samples.

An implementation of the image selection module 508 is as follows. First, the total cost for a sequence of T selected samples is the weighted sum of the target and concatenation costs:

$$C(\hat{V}_1^T, \hat{S}_1^T) = \Sigma_{i=1}^T \omega^t C^t(\hat{V}_i, \hat{S}_i) + \Sigma_{i=2}^T \omega^c C^c(\hat{S}_{i-1}, \hat{S}_i) \qquad (11)$$

The target cost of an image sample is measured by the Euclidean distance between their PCA vectors.

$$C^t(\hat{V}_i, \hat{S}_i) = \|\hat{V}_i - \hat{S}_i^T W\| \qquad (12)$$

The concatenation cost is measured by the normalized 2-D cross correlation (NCC) between two image samples $\hat{S}_i$ and $\hat{S}_j$ as Equation 13 below shows. Since the correlation coefficient ranges in value from −1.0 to 1.0, NCC is by nature a normalized similarity score.

$$NCC(I, J) = \operatorname{argmax}_{(u,v)} \frac{\sum_{x,y}[I(x,y) - \bar{I}_{u,v}][J(x-u, y-v) - \bar{J}]}{\left\{\sum_{x,y}[I(x,y) - \bar{I}_{u,v}]^2 \sum_{x,y}[J(x-u, y-v) - \bar{J}]^2\right\}^{0.5}} \qquad (13)$$

Assume that the corresponding samples of $\hat{S}_i$ and $\hat{S}_j$ in the sample library are $S_p$ and $S_q$, i.e., $\hat{S}_i = S_p$, $\hat{S}_j = S_q$, where, p and q are the sample indexes in video recording. And hence $S_p$ and $S_{p+1}$, $S_{q-1}$ and $S_q$ are consecutive frames in the original recording. As defined in Eq. 14, the concatenation cost between $\hat{S}_i$ and $\hat{S}_j$ is measured by the NCC of the $S_p$ and the $S_{q-1}$ and the NCC of the $S_{p+1}$ and $S_q$.

$$C^c(\hat{S}_i, \hat{S}_j) = C^c(S_p, S_q) = 1 - \tfrac{1}{2}[NCC(S_p, S_{q-1}) + NCC(S_{p+1}, S_q)] \qquad (14)$$

Because NCC $(S_p, S_p)$=NCC$(S_q, S_q)$=1, then $C^c(S_p, S_{p+1})$= $C^c(S_{q-1}, S_q)$=0, so that the selection of consecutive frames in the original recording is encouraged.

The sample selection procedure is the task of determining the set of image sample $\hat{S}_1^T$ so that the total cost defined by Equation 11 is minimized, which is represented mathematically by Equation 15:

$$\hat{S}_1^T = \operatorname{argmin}_{\hat{S}_1, \hat{S}_2, \ldots, \hat{S}_T} C(\hat{V}_1^T, \hat{S}_1^T) \qquad (15)$$

Optimal sample selection can be performed with a Viterbi search. However, to obtain near real-time synthesis on large dataset, containing tens of thousands of samples, the search space is pruned. One example of such pruning is implemented in two parts. First, for every target frame in the trajectory, K-nearest samples are identified according to the target cost. The beam width K can be, for example, between 1 and N (the total number of images). The number K can be selected so as to provide the desired performance. Second, the remaining samples are pruned according to the concatenation cost.

Figure 6:
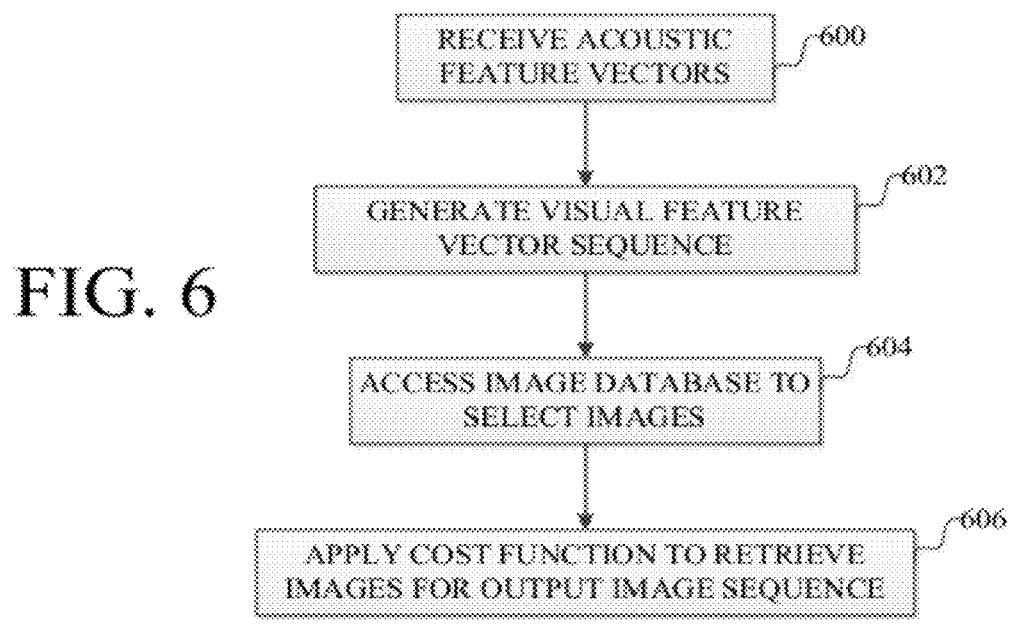
FIG. 6 is a flow chart describing synthesis of an image sequence.

The operation of a system such as shown in FIG. 5 will now be described in connection with the flowchart FIG. 6. In particular, the process begins by receiving 600 the acoustic feature vectors corresponding to the desired speech. The statistical model is used with these inputs to generate 602 a corresponding visual feature vector sequence. Using the visual feature vector sequence, the audiovisual database is accessed 604 to find matching images for each visual feature vector. Not all images that match need to be used or retained. A pruning function may be applied to limit the amount of computation performed. A cost function is applied 606 to each image, and an image corresponding to each visual feature vector is retained based on the cost. For example, an image with a minimal cost can be retained. The cost function can include a target cost and a concatenation cost.

As a result of this image selection technique, a set of real images closely matching the predicted trajectory and smoothly transitioning between each other provide a photorealistic image sequence with lip movements that closely match the provided audio or text. This sequence is then applied to the three-dimensional model of the head.

In particular, instead of using a precise model of the geometry mesh deformation, local facial motion is obtained by overlaying a dynamic, time varying texture (the image sequence generated by the synthesis module) on the structure. Unlike traditional texture mapping which generates a single texture for a surface, multiple textures are used in rendering, at least one for each frame. The selection mechanism of the HMM enables a texture to be chosen from multiple textures according to the desired facial motions and expressions at different times. The selection mechanism of the HMM in the synthesis module can also be applied to selection of images for different parts of the face, such as the eyes, wrinkle areas, etc. By using dynamic texture mapping, we bypass several difficulties in rendering soft tissues like lips, tongue, eyes, wrinkles, and make the 3D talking head look photorealistic. With the auto-reconstructed 3D geometry model, the head pose, illumination, and facial expressions of the 3D talking head can be freely controlled. In particular, head movement can be controlled by rotating and translating the head mesh model by viewing it as a rigid object. Different illumination can be realized by changing the lighting in the 3D rendering. Variant facial expressions like happy or sad can be controlled by deforming the mesh model.

The system for generating photorealistic three dimensional animations is designed to operate in a computing environment. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 7:
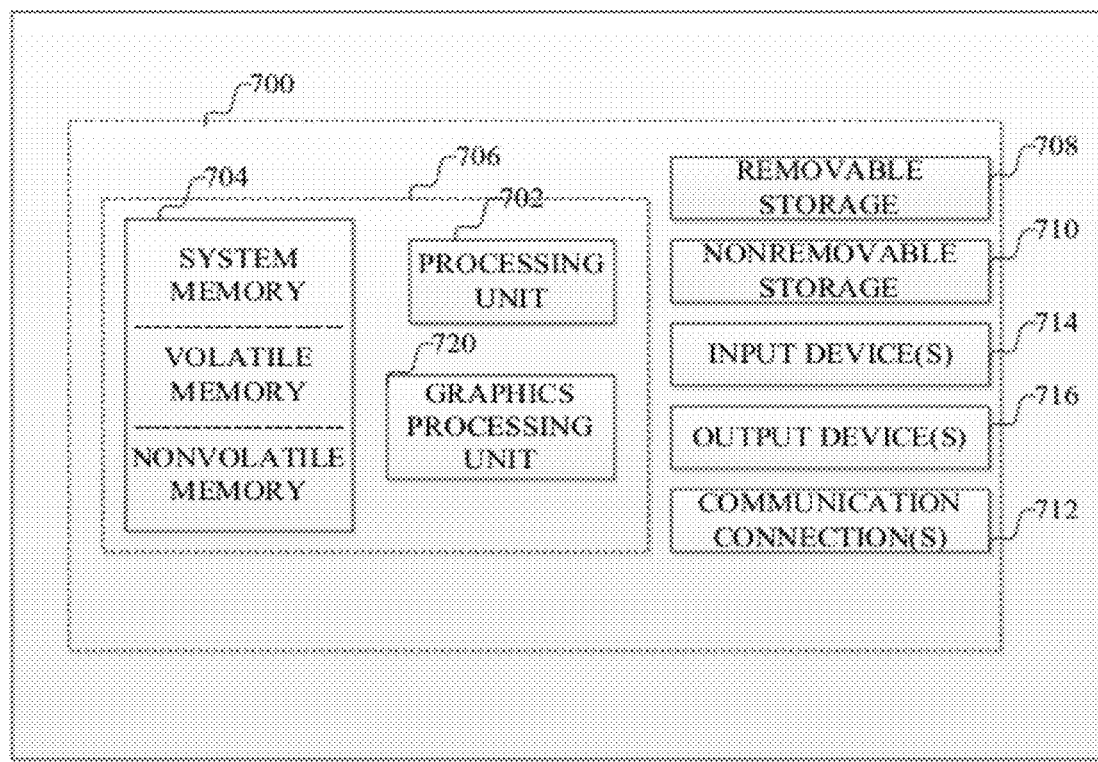
FIG. 7 is a schematic of an example computing device supporting implementation of a system for generating a photorealistic three dimensional animation, or one or more components thereof.

FIG. 7 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 7, an example computing environment includes a computing device, such as computing device 700. In its most basic configuration, computing device 700 typically includes at least one processing unit 702 and memory 704. The computing device may include multiple processing units and/or additional co-processing units such as graphics processing unit 720. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. Additionally, device 700 may also have additional features/functionality. For example, device 700 may also include additional storage (removable and/or non-removable) including, but not limited to, magnetic or optical disks or tape. Such additional storage is illustrated in FIG. 7 by removable storage 708 and non-removable storage 710. Computer storage media includes volatile and nonvolatile, removable and non-removable media implemented in any method or technology for storage of information such as computer program instructions, data structures, program modules or other data. Memory 704, removable storage 708 and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 700. Any such computer storage media may be part of device 700.

Device 700 may also contain communications connection(s) 712 that allow the device to communicate with other devices. Communications connection(s) 712 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Device 700 may have various input device(s) 714 such as a display, a keyboard, mouse, pen, camera, touch input device, and so on. Output device(s) 716 such as speakers, a printer, and so on may also be included. All of these devices are well known in the art and need not be discussed at length here.

The system for generating photorealistic animation may be implemented in the general context of software, including computer-executable instructions and/or computer-interpreted instructions, such as program modules, being processed by a computing device. Generally, program modules include routines, programs, objects, components, data structures, and so on, that, when processed by the computing device, perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented method for generating photo-realistic facial animation synchronized with speech, comprising:
   storing, in a computer storage device, a statistical model of audiovisual data over time, based on acoustic feature vectors from actual audio data and visual feature vectors of lips images extracted from real sample images of a head and facial features of an individual during a set of utterances by the individual;
   storing, in an image library, the real sample images of the individual's head and facial features during the set of utterances, including storing for each of the stored real sample images the visual feature vectors obtained from the lips image extracted from the real sample image as used to generate the statistical model;
   receiving an input set of acoustic feature vectors for the speech with which the facial animation is to be synchronized;
   using a computer processor, applying the received input set of acoustic feature vectors to the statistical model, the statistical model thereby generating a visual feature vector sequence;
   selecting, using a computer processor, a sequence of real sample images of the individual's head and facial features from the image library, such that the selected sequence matches the visual feature vector sequence generated using the statistical model by comparing visual feature vectors in the visual feature vector sequence with visual feature vectors associated with the real sample images in the image library: and
   using a computer processor, applying the selected sequence of real sample images to the three dimensional model of a head to provide the photo-realistic facial animation synchronized with the speech.

2. The computer-implemented method of claim 1, further comprising generating the statistical model, wherein generating the statistical model comprises:
   obtaining actual audiovisual data including a plurality of samples including real sample images of the individual's facial features for a set of utterances;
   extracting the acoustic feature vectors and the visual feature vectors for each sample of the audiovisual data; and
   training the statistical model using the acoustic feature vectors and the visual feature vectors.

3. The computer-implemented method of claim 1, wherein generating the visual feature vector sequence comprises maximizing a likelihood function with respect to the input acoustic feature vectors and the statistical model.

4. The computer-implemented method of claim 1, wherein selecting the sequence of real sample images comprises selecting a set of real sample images that minimizes a cost function.

5. The computer-implemented method of claim 4, wherein the cost function comprises a target cost indicative of a difference between a visual feature vector in the generated visual feature vector sequence and a visual feature vector related to a real sample image.

6. The computer-implemented method of claim 5, wherein the cost function comprises a concatenation cost indicative of a difference between adjacent real sample images in the selected sequence of real sample images.

7. The computer-implemented method of claim 1, wherein selecting the sequence of real sample images from the image library comprises identifying a sequence of real sample images from the image library that matches the generated visual feature vector sequence based on both a target cost and a concatenation cost.

8. The computer-implemented method of claim 1, wherein applying the selected sequence of real sample images comprises:

generating, using a computer processor, a sequence of images of the individual's head and facial features from the selected sequence of real sample images;

accessing an animated three-dimensional model of a head of the individual comprising a plurality of frames corresponding to the generated sequence of images; and using a computer processor, applying the generated sequence of images to the three dimensional model as a texture, such that different frames of the animated three-dimensional model are textured by different images of the generated sequence of images, to provide the photo-realistic facial animation synchronized with the speech.

9. A computer system for generating photo-realistic facial animation synchronized with speech, comprising:

a computer storage device storing a statistical model of audiovisual data over time, based on acoustic feature vectors from actual audio data and visual feature vectors of lips images extracted from real sample images of a head and facial features of an individual during a set of utterances by the individual;

an image library storing real sample images of the individual's head and facial features during the set of utterances, the image library further storing for each of the stored real sample images the visual feature vectors obtained from the lips image extracted from the real sample image as used to generate the statistical model;

a synthesis module having an input for receiving an input set of feature vectors for speech with which the facial animation is to be synchronized, and providing as an output a visual feature vector sequence corresponding to the input set of feature vectors according to the statistical model;

an image selection module having an input for receiving the visual feature vector sequence from the output of the synthesis module, and accessing the image library using the received visual feature vector sequence to generate an output providing a sequence of real sample images of the individual's head and facial features from the image library having visual feature vectors that match the visual feature vectors in the visual feature vector sequence received from the synthesis module by comparing visual feature vectors in the visual feature vector sequence with visual feature vectors associated with the real sample images in the image library; and an animation module having an input for receiving a three dimensional model of a head and the sequence of real sample images from the image selection module, and an output providing the facial animation synchronized with the speech.

10. The computer system of claim 9, further comprising:
a training module having an input receiving acoustic feature vectors and visual feature vectors from the audiovisual data of an individual's facial features during the set of utterances and providing as an output a statistical model of the audiovisual data over time.

11. The computer system of claim 10, wherein the training module comprises:

a feature extraction module having an input for receiving the audiovisual data and providing an output including the acoustic feature vectors and the visual feature vectors corresponding to each sample of the audiovisual data; and a statistical model training module having an input for receiving the acoustic feature vectors and the visual feature vectors and providing as an output the statistical model.

12. The computer system of claim 9, wherein the synthesis module implements a maximum likelihood function with respect to the input acoustic feature vectors and the statistical model.

13. The computer system of claim 9, wherein the image selection module implements a cost function and identifies a set of real sample images that minimizes the cost function.

14. The computer system of claim 13, wherein the cost function comprises a target cost indicative of a difference between a visual feature vector in the visual feature vector sequence and a visual feature vector related to a real sample image.

15. The computer system of claim 14, wherein the cost function comprises a concatenation cost indicative of a difference between adjacent real sample images in the sequence of real sample images.

16. The computer system of claim 9, wherein the image selection module accesses the image library using the visual feature vector sequence to identify a sequence of real sample images from the image library that matches the visual feature vector sequence based on both a target cost and a concatenation cost.

17. A computer program product comprising:
a computer storage device comprising at least one of a memory device or storage device;

computer program instructions stored on the computer storage device that, when processed by a computing device, instruct the computing device to perform a method for generating photo-realistic facial animation synchronized with speech, comprising:

storing, in a computer storage device, a statistical model of audiovisual data over time, based on acoustic feature vectors from actual audio data and visual feature vectors of lips images extracted from real sample images of a head and facial features of an individual during a set of utterances by the individual;

storing, in an image library, real sample images of the individual's head and facial features during the set of utterances, the image library further storing for each of the stored real sample images the visual feature vectors obtained from the lips image extracted from the real sample image as used to generate the statistical model;

receiving an input set of acoustic feature vectors for the speech with which the facial animation is to be synchronized;

using a computer processor, applying the received input set of acoustic feature vectors to the statistical model, the statistical model thereby generating a visual feature vector sequence;

selecting, using a computer processor, a sequence of real sample images of the individual's head and facial features from the image library, such that the selected sequence matches the visual feature vector sequence generated using the statistical model by comparing visual feature vectors in the visual feature vector sequence with visual feature vectors associated with the real sample images in the image library: and using a computer processor, applying the selected sequence of real sample images to the three dimensional model of a head to provide the photo-realistic facial animation synchronized with the speech.

18. The computer program product of claim 17, further comprising generating the statistical model, wherein generating the statistical model comprises:
   obtaining audiovisual data including a plurality of samples, including real sample images of the individual's facial features for the set of utterances;
   extracting the acoustic feature vectors and the visual feature vectors for each sample of the audiovisual data; and
   training the statistical model using the acoustic feature vectors and the visual feature vectors.

19. The computer program product of claim 17, wherein selecting the sequence of real sample images comprises selecting a set of real sample images that minimizes a cost function.

20. The computer program product of claim 19, wherein the cost function comprises a target cost indicative of a difference between a visual feature vector in the generated visual feature and a visual feature vector related to a real sample image, and a concatenation cost indicative of a difference between adjacent images in the sequence of real sample images.

* * * * *